J. RISSEL.
Vehicle-Hubs.

No. 155,590.  Patented Oct. 6, 1874.

Attest.
Jas. H. Layman.
H. T. Janner.

Joseph Rissel
By Knight Bros.
Att'ys.

UNITED STATES PATENT OFFICE.

JOSEPH RISSEL, OF LAWRENCEBURG, INDIANA.

IMPROVEMENT IN VEHICLE-HUBS.

Specification forming part of Letters Patent No. 155,590, dated October 6, 1874; application filed January 23, 1874.

*To all whom it may concern:*

Be it known that I, JOSEPH RISSEL, of Lawrenceburg, Dearborn county, Indiana, have invented a new and useful Wheel for Barrows, &c., of which the following is a specification:

My invention relates to a wheel which has been designed more especially for application to barrows and other vehicles that are employed in transporting comparatively light loads; and the improvement consists in furnishing such wheels with an axle that is capable of being lengthened or shortened, so as to adapt it to different widths of barrows. The middle portion of this axle is halved together, and united by a couple of sliding clips, while the ends or gudgeons of said axle project through cylindrical heads, the latter having coupled to them the T-shaped terminations or bowed braces. These bowed braces are passed through suitable slots in the arms or spokes of the wheel, and are provided with slots and bolts or other retaining devices, wherewith said braces can be adjusted, so as to correspond with the lengthening or shortening of the axle, as hereinafter fully described.

Figure 1:
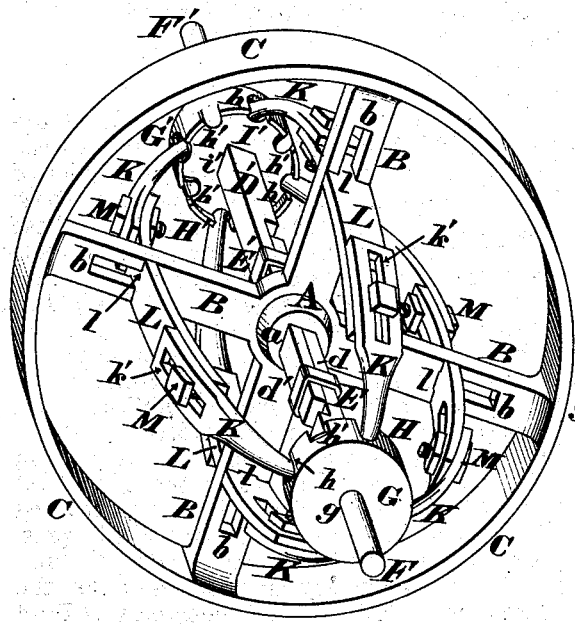
Figure 2:
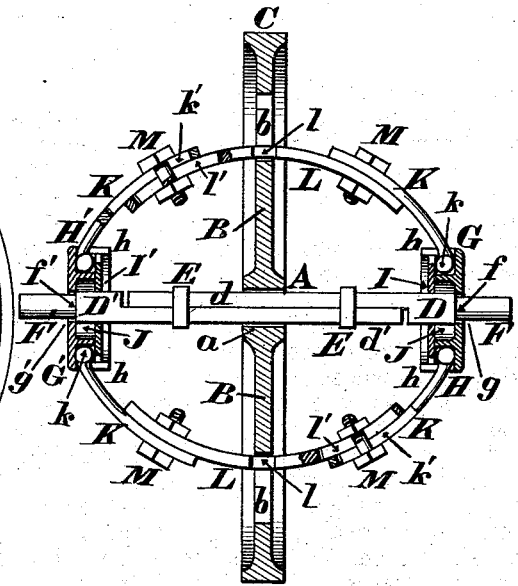
Figure 3:
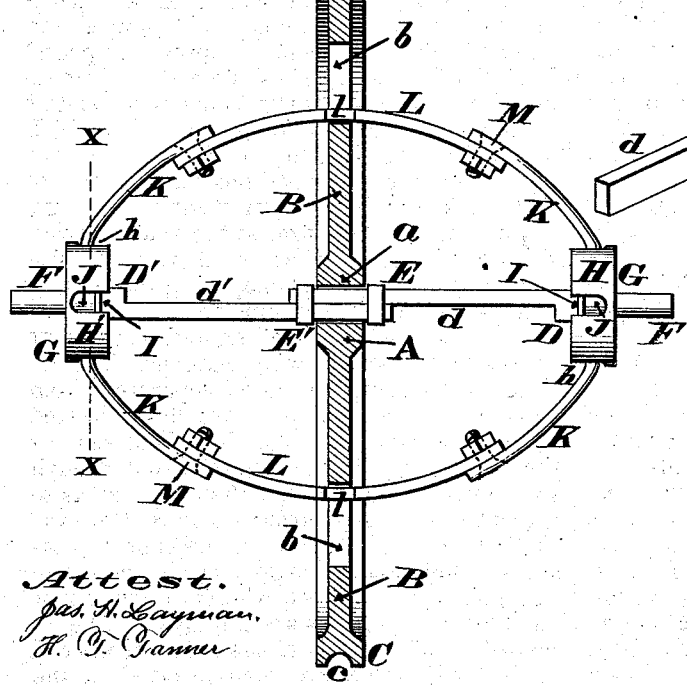
Figure 4:
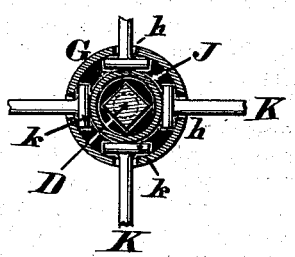
Figure 5:
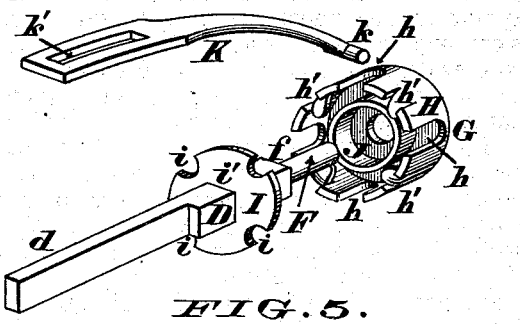

Figure 1 is a perspective view of a wheel embodying my improvements, the axle thereof being shortened, so as to be journaled in a narrow frame or vehicle. Fig. 2 is a vertical section of the same in the plane of the axle. Fig. 3 is a vertical section, showing the axle lengthened and applied to a wheel of increased diameter, a pair of the bowed braces being removed. Fig. 4 is a perspective view of the adjusting devices of the wheel detached from each other; and Fig. 5 is a transverse section through one of the heads at the lines X X.

A represents a hub or nave, from which radiate arms or spokes B to the rim or tread C of the wheel, said hub, spokes, and rim being preferably cast in one piece, so as to avoid fitting. The hub is pierced with a square or other non-circular aperture, a, to receive the halved portions d d' of the separable members or bars D D', that constitute the axle of the wheel. Adapted to surround the aforesaid halved portions of the axle are closely-fitting but slidable clips or bands E E', which serve to maintain the members D D' in line with each other. The outer ends of axles D D' are turned down, so as to form journals or gudgeons F F', shoulders f f' being left between said gudgeons and the non-circular portion of the members D D', which shoulders bear against the inner sides of heads G G'. These heads consist of stout circular plates or castings, having central apertures g g' for the reception of the axle-gudgeons, and being furnished with inwardly-projecting rims H H'. These rims are notched at h to receive the reduced portions of the bowed braces, (to be hereafter described,) and, in addition, said rims are provided with rearwardly-bent lips h', that serve to retain the disks I I' securely in their proper position within the cylindrical heads G G' H H'. The disks are provided with notches i, for a purpose which will presently appear, and they are pierced at their centers with non-circular apertures i', for the reception of the separable members D D' of the axle. Each of the heads G G' is provided with an inwardly-projecting continuous flange, J, although a suitable number of lugs may be substituted therefor. These flanges, or their equivalents, are designed as abutments or supports for sustaining the T-shaped terminations k of the bent or bowed compound braces K L, whose central members, L, are reduced in width at l, so as to enter the slots b of spokes B. These compound braces K L are slotted, respectively, at k' l', to receive bolts M, wherewith said braces are capable of being retained in a proper position to correspond with the condition of the axle, whether the same be lengthened or shortened. The periphery of the wheel may be grooved at e, so as to run upon a suitable track.

My wheel is fitted together, and adjusted at pleasure, in the following manner: The various parts being supposed separated from each other, the braces L are first inserted edgewise through the slots b, and, as soon as their diminished portions l have passed through said slots, the braces are then over, so as to present their broad surfaces toward the axle. This simple act is all that is necessary in order to couple these portions of the braces to the spokes of the wheel, whether a greater or less number of spokes are employed. The T-shaped terminations k of the outer member K of the bent braces are then inserted in the heads G G', so as to rest upon the flanges or other supports J, after which the disks I I' are applied to said heads.

The manner of applying these disks is as follows: Their notches $i$ are placed in line with the lips $h'$ of the rims H H', and the disks are then shoved into the heads G G' until they come in contact with the flanges J, after which said disks are rotated sufficiently to bring the lips $h'$ opposite the blank or un-notched portions of said plates I I'. This act locks the braces K securely in the heads G, and thereby prevents them becoming accidentally detached therefrom. The halved portions $d\,d'$ of the axle are now inserted in the non-circular aperture $a$ of the hub, and adjusted, so as to cause the gudgeons F F' to project an equal distance from the sides of the wheel, which projection is regulated by the width of frame or vehicle within which the wheel is to be journaled. The clips or bands E E' are then slipped over the halved portions of the axle, and the braces K lapped over the ones L, and secured by the bolts or other retaining devices M, which act completes the fitting together of the wheel; and it can be at any time disjointed by simply reversing the above-described operation.

To lengthen the axle, it is only necessary to slacken the bolts M, draw the members D D' as far apart as may be necessary, and then again tighten up said retaining devices.

As the heads G G' bear against the shoulders $f\,f'$, and as the bolts M prevent any sliding of the compound braces K L, it will be readily seen that the axle, after being once adjusted and set, cannot be accidentally shifted, no matter how much lateral strain may be brought to bear upon the wheel.

The adjustable braces and slidable axles can be applied to wheels of various diameters, as shown in Fig. 3, where C' represents a wheel somewhat larger than the one shown in Figs. 1 and 2.

If preferred, the heads of the bolts M may be countersunk, as indicated in Fig. 3.

I claim as my invention—

The adjusting devices, consisting of the separable and halved axle D $d$ D' $d'$ F $f$ F' $f'$, bands E E', heads G $g$ G' $g'$ H $h$ H' $h'$ J, disks I I' $i\,i'$, and compound braces K $k\,k'$ L $l\,l'$, M, employed in connection with the wheel A C and slotted spokes B $b$, all combined as and for the purpose set forth.

In testimony of which invention I hereunto set my hand.

JOSEPH RISSEL.

Attest:
   GEO. H. KNIGHT,
   S. B. SPEAR.